United States Patent
Meganathan

(10) Patent No.: US 9,218,729 B2
(45) Date of Patent: Dec. 22, 2015

(54) SYSTEM AND METHOD OF MONITORING THE VIDEO SURVEILLANCE ACTIVITIES

(71) Applicant: Honeywell International Inc., Morristown, NJ (US)

(72) Inventor: Deepak Sundar Meganathan, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 302 days.

(21) Appl. No.: 13/772,128

(22) Filed: Feb. 20, 2013

(65) Prior Publication Data

US 2014/0232873 A1 Aug. 21, 2014

(51) Int. Cl.

| G08B 13/00 | (2006.01) |
|---|---|
| H04N 7/18 | (2006.01) |
| G06F 3/00 | (2006.01) |
| G07B 15/02 | (2011.01) |
| G08B 13/196 | (2006.01) |
| G06F 3/0481 | (2013.01) |
| G06F 3/0484 | (2013.01) |
| G07C 1/00 | (2006.01) |
| G08B 19/00 | (2006.01) |
| G08B 25/14 | (2006.01) |
| G07C 3/00 | (2006.01) |

(52) U.S. Cl.
CPC ...... *G08B 13/19682* (2013.01); *G06F 3/04817* (2013.01); *G06F 3/04842* (2013.01); *G07C 1/00* (2013.01); *G08B 13/19671* (2013.01); *G07C 3/00* (2013.01); *G08B 13/19695* (2013.01); *G08B 19/00* (2013.01); *G08B 25/14* (2013.01); *H04N 7/188* (2013.01)

(58) Field of Classification Search
CPC ............ G06F 17/00; G06F 3/00; G07B 15/02
See application file for complete search history.

(56) References Cited

U.S. PATENT DOCUMENTS

| 5,635,693 | A | * | 6/1997 | Benson et al. ............. 340/10.33 |
|---|---|---|---|---|
| 2005/0132414 | A1 | * | 6/2005 | Bentley et al. ................ 725/105 |
| 2007/0033632 | A1 | | 2/2007 | Baynger et al. |
| 2010/0033566 | A1 | * | 2/2010 | Drive et al. ................... 348/143 |
| 2012/0300081 | A1 | | 11/2012 | Kim |

OTHER PUBLICATIONS

European Search Report for corresponding EP application 14153356.2, dated Jul. 22, 2014.

* cited by examiner

*Primary Examiner* — Sath V Perungavoor
*Assistant Examiner* — Patricia I Young
(74) *Attorney, Agent, or Firm* — Husch Blackwell LLP

(57) ABSTRACT

A method and apparatus. The method includes the steps of an activity analysis processor monitoring the activities of a security system protecting a secured area and a human operator of the security system and evaluating the system's and operator's activities, the activity analysis processor detecting an event and saving a summary of the event to a cloud server, a user interface of the cloud server detecting a request from a user for a report of activities and the cloud server downloading the activity report to the user, the activity report displayed to the user including playback features controlling playback of the summary, the playback features further including provision to accept requests for additional data from the user and the playback features downloading and displaying the additional data in response to the requests.

17 Claims, 3 Drawing Sheets

SYSTEM AND METHOD OF MONITORING THE VIDEO SURVEILLANCE ACTIVITIES

FIELD

The field is related to security systems and more particularly, to methods monitoring activities within a security system.

BACKGROUND

Security systems are generally known. Such systems typically include a number of sensors that detect intruders or other unauthorized persons within a secured area. One or more closed circuit television (CCTV) cameras may also be used to detect intruders or other signs of trouble.

The CCTV cameras may be coupled to a display monitored by a security guard. The guard may be local or the guard may monitor the cameras from a remote location.

The secured area may be limited to a relatively small area (e.g., a home) with relatively few occupants or cover a relatively large area (e.g., an airport) that has many occupants.

In the case of large areas, such as an airport, the number of cameras may be large (e.g., numbering in the hundreds). Where the number of cameras is large, a switching mechanism may be used to display an image from each camera to the guard before switching to another camera.

While existing security systems for large areas work well, they are difficult to supervise. This is necessarily the case because each security event detected with a security system is potentially different than any other event and, in most cases, is not related to any other event. Because of the difficulty of supervising security systems, a need exists for better methods of correlating events within such systems.

DETAILED DESCRIPTION OF AN ILLUSTRATED EMBODIMENT

Figure 1:
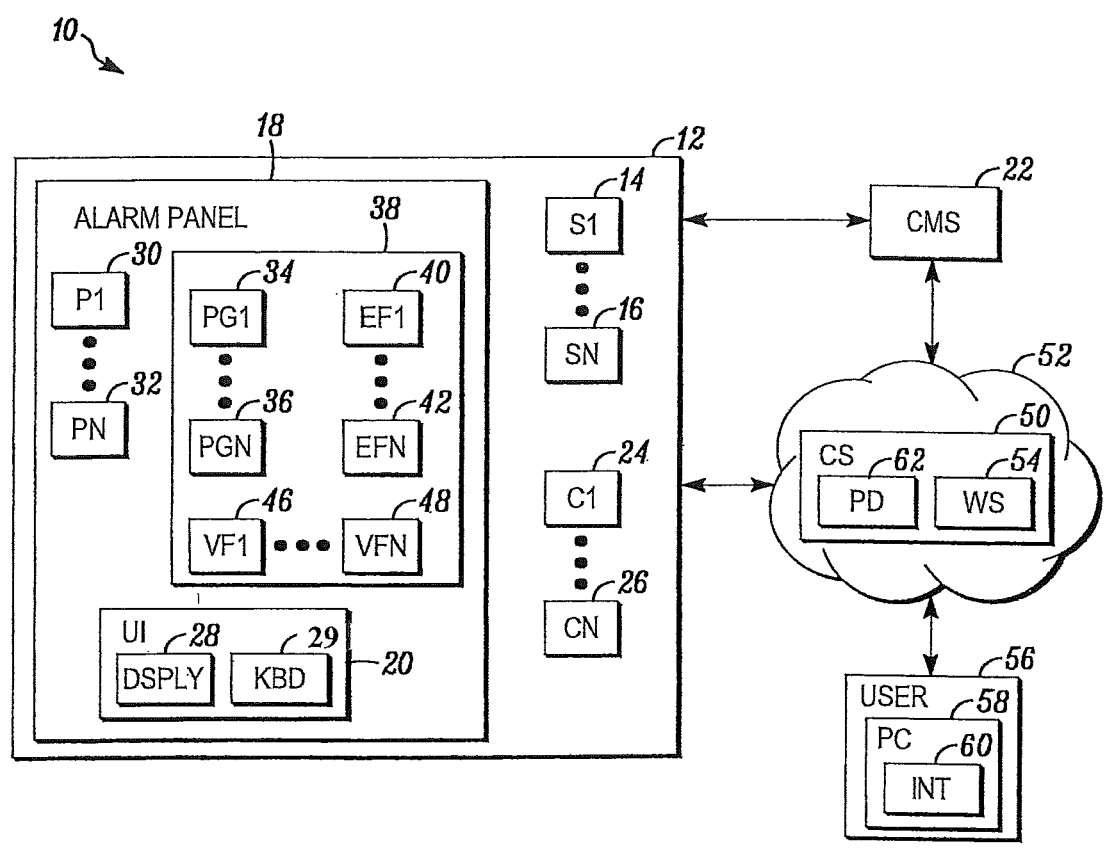
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Included within the security system 10 are a number of sensors 14, 16 used to detect events within a secured area 12. The sensors may be switch attached to one or more portals (e.g., doors, windows, etc.) providing entrance into and egress from the secured area. Alternatively, the sensors may be environmental detectors (e.g., smoke detectors) or motion detectors.

The sensors may be coupled to an alarm system control panel 18. Upon detection of the activation of one of the sensors, the panel may couple an alert or other alarm message to a user interface 20. Alternatively, or in addition, the panel 18 may couple an alarm message to a central monitoring station 22.

Also included within the secured area may be one or more cameras 24, 26. Video from the cameras may be shown in a display 28 of the user interface 20. A human operator may use a keyboard or touchscreen 29 of the user interface 20 to select a camera 24, 26 as a source of video to be shown on the display 28 or to acknowledge alarms originating from one of the sensors.

Included within the panel 18 may be one or more processing apparatus (processors) 30, 32 operating under control of one or more computer programs 34, 36 loaded from a non-transient computer readable medium (memory or database) 38. As used herein, reference to a step performed by a computer program is also a reference to the processor executing that step.

During operation of the system 10, an alarm processor may monitor each of the sensors for events (e.g., intruder, fire, etc.) associated with the secured area. Upon detecting an event, the alarm processor may activate a camera with a field of view that includes the activated sensor.

The alarm processor (or a separate event processor) may save a summary of the event into an event file 40, 42. Each event may include an identifier of the sensor that detected the event and a time of activation of the sensor. In the event that a camera was activated in response to the event, the event file may also include a video clip of the event.

Other processors may monitor the cameras. For example a motion detection processor may process video frames to detect events, such as motion, within the secured area. Upon detecting motion, an alert may be sent to the user interface 20. The motion detection processor may also save an indicator of the detection of motion as an event incident within an event file. A video clip of the detected motion may also be saved within the event file.

A video signal processor may also monitor the cameras for proper operation. In the event of loss of signal from a camera, the video signal processor may generate a warning event message and save a record of the event in an event file.

A video recording processor may also save video into one or more video files 46, 48 continuously or only when an event associated with the camera is detected. A file processor may monitor the saving of video into the files in order to detect malfunctions of the camera or of the associated apparatus that saves video into the files.

In this regard, malfunctions may be saved as warning events. In contrast, malfunctions that relate to the manner of storing video may be saved as recommendations that allow a supervisor to assess the need for remedial actions.

The user interface 20 may located on the panel 18 or may be a separate terminal used by a security guard. At the beginning of a work shift, the security guard may sign into the system by entering a personal identifier (ID) through the keyboard 30. Each time the guard signs in, a terminal processor may save the sign-in as an event within an event file.

The terminal processor may also monitor operator activity in conjunction with events. In this regard, each time the operator acknowledges an alert of an event, the terminal processor may also save the identifier of the human operator within the corresponding event file.

In addition to saving the ID of the operator, the terminal processor may also track and store a record of the actions taken by the human operator in response to the event. For example, if the operator activates one of the cameras in response to an event, a record of the response including an identifier of the camera and time of activation may also be saved in the event file.

In addition to saving operator actions, the terminal processor may also save messages intended for a security system supervisor. In this regard, the operator may activate a message icon on his/her screen and type a message to the supervisor (e.g., asking for help in investigating an event). The terminal processor may save the message as a help request in the associated event file.

The system 10 may also include a statistics processor that generates and saves deviation, trend, pattern and criticality information related to each respective activity. The statistics processor may monitor the terminal used by the operator for activity or simply review data previously saved within the event files. For example, the statistics processor may collect the number of alarm messages per time period and save the number of alarm messages per time period as a separate event within one of the event files. The statistics processor may also retain statistics over a longer period, detect deviations from the long term average and save indications of such deviation within an event file.

The statistics processor may also have access to a list of critical functions and activities. This list may be based upon single events or combinations of events. For example, one of the critical functions may be a need for the human operator to respond to an alarm alert within a predetermined period of time. In the case of a fire alert, this need would be based upon a need to prevent the spread of the fire. Alternatively, in the case of an intruder, a quick response by the operator may allow the operator to capture video images of the intruder. In each case, the statistics processor may determine a response time based upon criticality and an average response time. Such data may also be stored as data within an event file.

The system 10 also includes an activities analysis processor that detects changes to the event files within the system database 38. The changes may be in the form of critical events or alarms, system and/or operator activities that deviate from a historical norm or a norm of other operators, system and/or operator activities that form certain patterns, or system and/or operator activities that generate or appear to form some new trend. The activities analysis processor may collect this information from the event files in real time and upload real time summaries of the collected information to one or more programmed processors 30, 32 of a cloud server 50 that is accessed through the Internet 52. The summaries are, in turn, saved as posts in a post database 62.

The posts to the database 62 may be in the form of video or video clips, image(s), text, audio, charts and graphs. The posts, in turn, may each have a searchable title such as data, actions, warnings, help requests and recommendations. The posts are stored in the database 62 for retrieval by a user through a portable device 56.

Once uploaded to the cloud server 50, a user may access a website 54 of the cloud server 50 and download the summary through the portable user device 56. A programmed processor 30, 32 within the user device may present the summary to the user through a display of the user device 56. For example, the display may automatically show a list of currently active alarms within the security system 10. Critical alarms may be highlighted or the critical alarms shown as a separate list. One or more of the entries on the list may have a video clip attached.

Included within the summary downloaded to the user device 56 may be a playback control 58. The playback control 58 may be a Java script or other computer program 34, 36 that executes on a processor of the user device 56 and that controls playback (e.g., scrolling) of the items within the summary. In this regard, the summary may include a report of most recent activities reported within a real time timeline window. In this regard, the summary may include a list of events within the timeline window, an identifier of the human operator who responded to the event as well as statistics for the time period. The playback control 58 allows the user to scroll through the list, select certain items to see additional detail and playback any video clips attached to the item.

Alternatively, the playback control 58 may allow a user to select specific types of information by title (e.g., data, actions, warnings, help requests, recommendations, etc.). Upon selection of one of these titles, a timeline window of data related to each of these titles may be displayed.

The playback control 58 may further include an interface 60 that presents a menu and accepts requests for additional data from the user. In this regard, the additional data may have to do with a selected item from the summary or the menu may allow access to global features.

The playback control downloads and displays the additional data to the user in response to the requests. For example, the menu may have titles such as alarms, data, actions, warnings, help requests and recommendations. Selection of a title from the menu may cause the playback control 58 to download and present summaries to the user of data related to the title.

The timeline window of the summary may be set by the user of the portable device 56 to any appropriate time period (e.g., one hour, one day, etc.) through the interface 60 of the playback control. The user may also set a time period including a start and stop time for data. However, once set for a predetermined rolling time period, the portable device 56 may receive real time data that is displayed on the device 56 substantially instantaneously after being reported within the alarm system 10 with the most recent data displayed first.

In another regard, the interface 60 provided through the playback control may provide a search function. Using the search function, the user may specify a search parameter for displaying data from the post database 62. For example, the user may use an identifier of an operator as a search term. In response, a search processor of the server 50 may search for any event associated with the identified operator. The search processor may also display events handled by the operator, actions taken by the operator in response to the events and/or statistics of the operator (e.g., time to respond to alerts, types of responses to alerts, etc.). The search processor may also display any deviations of the operator in handling alerts when compared to the statistics of other operators.

Alternatively, the user may specify a type of alarm (or event) or of an alarm (or event) from specific sensors. In response, the playback control may retrieve similar events handled by the same or different operators.

The playback control 58 may also have a message interface that allows the operator of the device 56 to communicate with the human operator on duty at the terminal 20. The operator of the device 56 may send short messages to the operator at the terminal inquiring about system status, alarm detail or certain alarms shown on the display of the device 56. The operator on duty at the terminal 20 may respond with a message providing an explanation.

Figure 2:
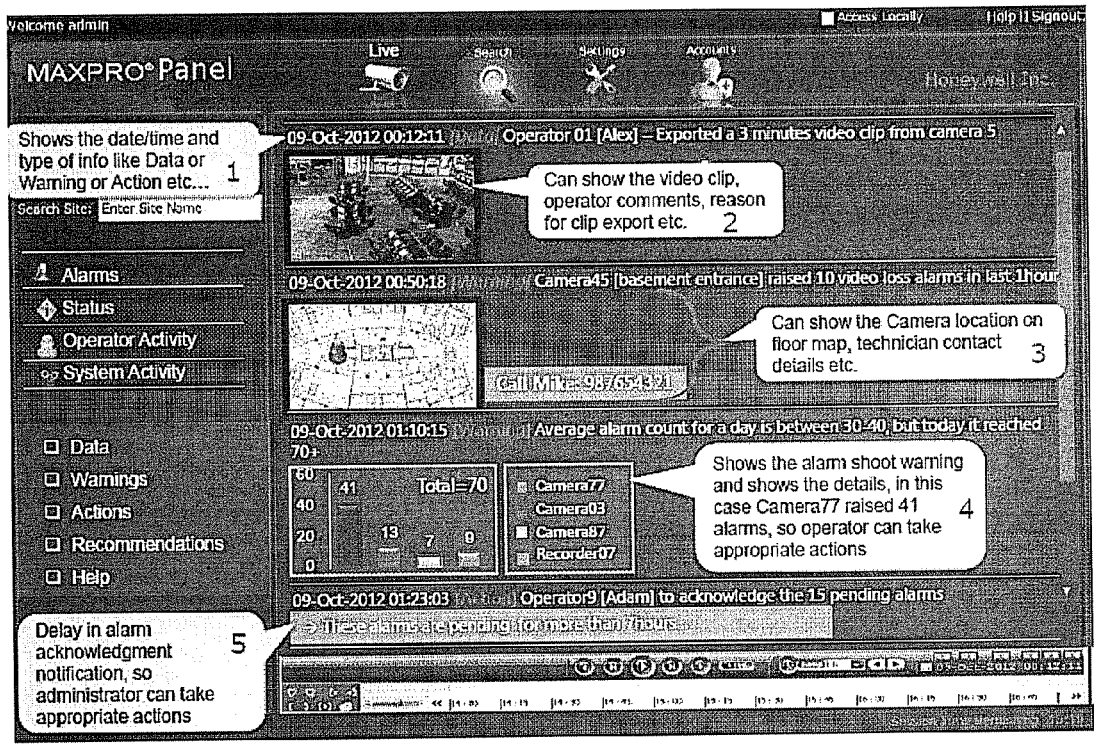
FIG. 2 depicts a first example of an activity report displayed to a user.

FIG. 2 provides a first example of a report delivered to a user. For example, FIG. 1 shows a screen including a first summary with a first portion that shows (1) data including a time, date and an operator's name. The first summary also indicates that a 3-minute video clip is attached. A sub-window or portion in the first summary shows (2) a first frame of the clip.

A second summary of FIG. 2 includes a first portion that shows a time and date and a warning. In this case, the warning shows (3) that a particular camera has had an inordinate number of video loss indications within a predetermined time period. The summary also shows a map of the camera location as well as technical details of who to call to service the camera.

A third summary of FIG. 2 shows (4) a summary of alarm events. In this case, the summary indicates the source of the events.

A fourth summary portion of FIG. 2 shows delayed alarms. In this case, the portion shows (5) alarms that have not been acknowledged or acted upon by an operator. The user may click on the forth summary to see a list of alarms in this category.

Figure 3:
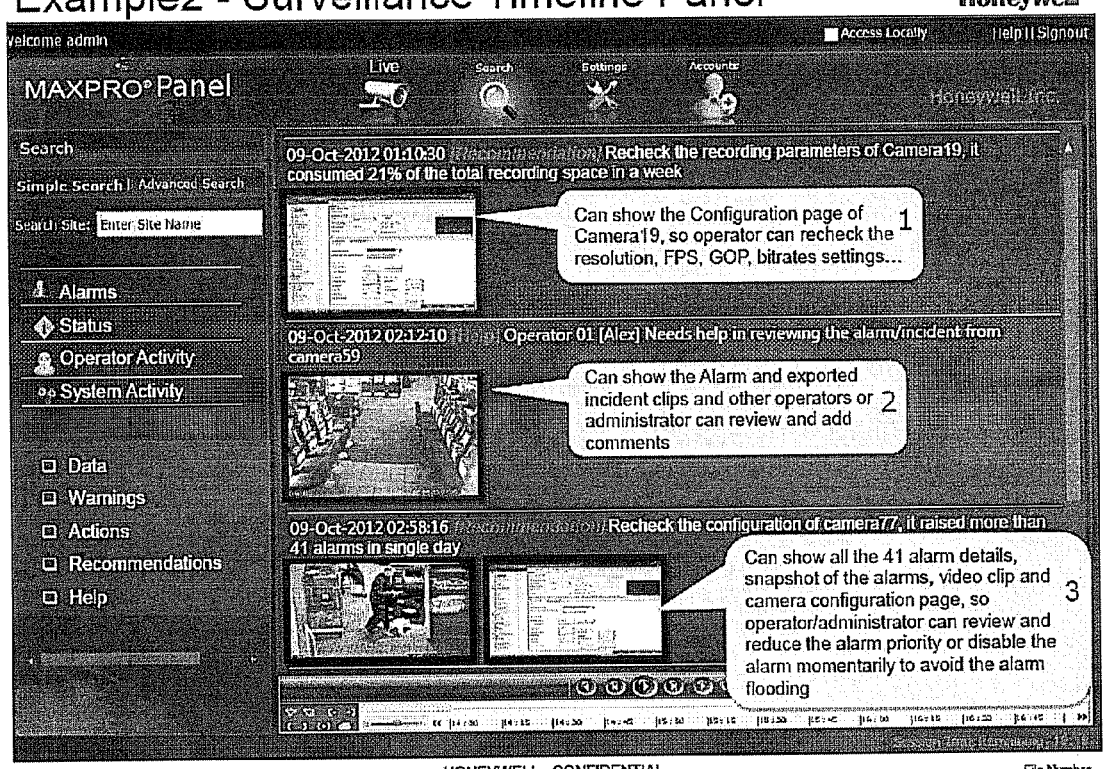
FIG. 3 depicts a second example of an activity report displayed to a user.

FIG. 3 provides a second example of a report delivered to a user. For example, an upper-most window shows an event report delivered to an operator of the system 10. The upper-most window shows a recommendation window that may be generated by a parameter monitoring processor and displayed to the operator in the case where a camera consumes an inordinate amount of resources available within the system. In this case, the processor displays a configuration page of a camera (e.g., camera 19). The configuration page may depict a current list of settings of the camera so that the operator can recheck the camera settings (e.g., resolution, GOP, bit rate settings, etc.) as shown in information box 1.

The second window, shown in FIG. 3, depicts an event window that also may be displayed to an operator. In this case, an image processor of the system may detect some event within a set of images (e.g., motion) and display that event to the operator. The displayed event may include a notification of the type of event (e.g., notice of detection of motion) and a video frame in which the type of event was detected. In this case, the operator may identify a set of images associated with the event (e.g., a video clip that incorporates the event frame) and attach that clip to the event notification and export that notification to the cloud server. In addition, the operator or a supervisor or other operators can add comments (as an attached text box) to that notification.

In a third window of FIG. 3, is shown an event window that may be displayed to an operator and exported to the cloud server. For example, a parameter processor may detect an inordinate number of events from a sensor (e.g., motion events detected by a particular camera within a predetermined time period). In response, the parameter processor may generate a recommendation (and event) that identifies the trigger of the detected event (e.g., too many alarms from a particular camera during the predetermined time period) and an information page for the sensor (e.g., a configuration page for the sensor and/or other sensors, the number of events for all sensors, etc.). In this case, the recommendation event page shows all of the alarm details associated with the event, a snapshot of the alarms, a video clip and camera configuration page. The notification page is displayed so that the operator/administrator can review and take some particular action such as reducing the priority of the detected event or disabling the event (or changing the threshold) for some time period in order to avoid flooding the alarm system with notifications of events.

In general, the system 10 may provide a convenient method for reporting data to a supervisor. The method may include the steps of an activity analysis processor monitoring the activities of a security system protecting a secured area and a human operator of the security system and evaluating the system's and operator's activities within a security system database based upon the deviation, trend, pattern and criticality of each respective activity, the activity analysis processor detecting an event within the monitored activities and saving a summary of the event to a cloud server, the summary including one or more of video, image, text, audio, charts and graphs relating to protection of the secured area, a user interface of the cloud server detecting a request from a user for a report of activities reported within a real time timeline window, the activity report including at least a content of the summary of the event associated with the secured area, the activity report further containing one or more of data, actions, warnings, help requests and recommendations generated by the activity analysis processor, wherein the cloud server updates an internal database of the cloud server in real time based upon posts from the activity analysis processor or operator and the cloud server downloading the activity report to the user, the activity report displayed to the user including playback features controlling playback of the summary, the playback features further including provision to accept requests for additional data from the user and the playback features downloading and displaying the additional data in response to the requests.

Alternatively, the system may be defined by an apparatus. The apparatus may include a cloud server, an activity analysis processor that monitors the activities of a security system protecting a secured area and of a human operator of the security system and that evaluates the system's and operator's activities within a security system database based upon the deviation, trend, pattern and criticality of each respective activity, the activity analysis processor detects an event within the monitored activities and saves a summary of the event to the cloud server, the summary includes one or more of video, image, text, audio, charts and graphs relating to protection of the secured area, a user interface of the cloud server that detects a request from a user for a report of activities reported within a real time timeline window, the activity report including at least a content of the summary of the event associated with the secured area, the activity report further containing one or more of data, actions, warnings, help requests and recommendations generated by the activity analysis processor, wherein the cloud server updates an internal database of the cloud server in real time based upon posts from the activity analysis processor or operator and an interface processor of the cloud server that downloads the activity report to the user, the activity report displayed to the user further comprises a playback control executing on a processor of the user and that controls playback of the summary, the playback control further including an interface that accepts requests for additional data from the user and the playback control downloads and displays the additional data to the user in response to the requests.

Alternatively, the apparatus may include a cloud server, a security system that protects a secured area, a database of the security system, an activity analysis processor of the security system that monitors the activities of the security system and a human operator of the security system based upon entries within a security system database, the activity analysis processor evaluates the system's and operator's activities based upon the entries, a criticality of each respective activity and averages of each activity including any deviation, trend or pattern, the activity analysis processor detects events within the monitored activities and saves a summary of the events to the cloud server, the summary includes one or more of video, image, text, audio, charts and graphs relating to protection of the secured area and a user interface of the cloud server that detects a request from a user for a report of activities occurring within a real time timeline window and downloads the activity report to the user, the activity report including at least a content of the summary of the event associated with the secured area, the activity report further containing one or more of data, actions, warnings, help requests and recommendations generated by the security system or operator, wherein the cloud server updates an internal database of the cloud server in real time based upon posts from the activity analysis processor or operator.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
   a security system monitoring a plurality of sensors including at least a first switch attached to a door providing entrance into and egress from a secured area and upon detecting an event saving a summary of the event into an event file;
   the security system tracking and storing a record of actions taken by a human operator in response to each event in an event file;
   an activity analysis processor monitoring the activities of the security system via the event files and evaluating the system's and operator's activities within a security system database based upon deviations, trends, patterns and criticalities of each respective activity; the activity analysis processor detecting an event within the monitored activities and saving a summary of the event to a cloud server or private data server, the summary including one or more of video, image, text, audio, charts, graphs and links to other applications relating to protection of the secured area, the link to other applications based upon the human operator at least clicking on an image of a camera and opening a configuration page of the camera, checking recording parameters of the camera based upon a percentage of total recording space consumed by the camera during a previous week or rechecking a resolution based upon a frames per second, GOP or bitrate setting of the camera;
   a user interface of the cloud server or private data server detecting a request from a user for a report of activities reported within a real time timeline window, the activity report including at least a content of the summary of the event associated with the secured area, the activity report further containing one or more of data, actions, warnings, help requests and recommendations generated by the activity analysis processor, wherein each of the data, actions, warnings, help requests and recommendations include one or more of video, image text, audio, charts and graphs, wherein the cloud server updates an internal database of the cloud server in real time based upon posts from the activity analysis processor or operator;
   the cloud server or private data server downloading the activity report to the user, the activity report displayed to the user including playback features controlling playback of the summary, the playback features further including provision to accept requests for additional data from the user and the playback features downloading and displaying the additional data in response to the requests, wherein the playback controls include at least one of a play control that displays activities in sequence for a selected time, pause, fast forward, step forward, step reverse and jump;
   generating a list and identifiers of alarms occurring within the timeline window for inclusion in the report; and including an identifier of the human operator that responded to each of the alarms of the list in the report.

2. The method as in claim 1 further comprising attaching a video clip to the report.

3. The method as in claim 1 further comprising including trouble indicators within the report.

4. The method as in claim 1 further comprising generating a trend indicator defined by a number of alarms per time period for inclusion in the report.

5. The method as in claim 1 further comprising including comments of the human operator in the report.

6. An apparatus comprising:
   a security system that monitors a plurality of sensors including at least a first switch attached to a door providing entrance into and egress from a secured area and upon detecting an
   event saving a summary of the event into an event file, the security system tracking and storing a record of actions taken by a human operator in response to each event in an event file;
   a cloud server;
   an activity analysis processor that monitors the activities of the security system via the event files and that evaluates the system's and operator's activities within a security system database based upon deviations, trends, patterns and criticalities of each respective activity, the activity analysis processor detects an event within the monitored activities and saves a summary of the event to the cloud server, the summary includes one or more of video, image, text, audio, charts and graphs relating to protection of the secured area; a user interface of the cloud server that detects a request from a user for a report of activities reported within a real time timeline window, the activity report including at least a content of the summary of the event associated with the secured area, the activity report further containing one or more of data, actions, warnings, help requests and recommendations generated by the activity analysis processor, wherein the cloud server updates an internal database of the cloud server in real time based upon posts from the activity analysis processor or operator; and
   an interface processor of the cloud server that downloads the activity report to the user, the activity report displayed to the user further comprises a playback control executing on a processor of the user and that controls playback of the summary, the playback control further including an interface that accepts requests for additional data from the user and the playback control downloads and displays the additional data to the user in response to the requests;
   wherein the report further comprises a list of alarms that occurred during the timeline window and an identifier of the operator that responded to each alarm of the list.

7. The apparatus as in claim 6 wherein the playback control further comprises a timeline interface coupled to the user interface of the cloud server that receives a temporal duration of the timeline window from the user.

8. The apparatus as in claim 6 wherein the playback control further comprises a timeline interface coupled to the user interface of the cloud server that receives a starting and ending time of the timeline window from the user.

9. The apparatus as in claim 6 further comprising a video clip attached to the report or additional data identified through the user interface.

10. The apparatus as in claim 9 wherein the playback control further comprises a video interface that controls playback of the video clip based upon inputs from the user.

11. An apparatus comprising:
a cloud server;
a security system that protects a secured area;
a database of the security system;
a processor of the security system that monitors a plurality of sensors including at least a first switch attached to a door providing entrance into and egress from the secured area and upon detecting an event saving a summary of the event into an event file;
a processor of the security system that tracks and stores a record of the actions taken by a human operator in response to each event in an event file;
an activity analysis processor of the security system that monitors the activities of the security system based upon entries within a security system database, the activity analysis processor evaluates the system's and operator's activities based upon the entries, a criticality of each respective activity and averages of each activity including any deviation, trend or pattern, the activity analysis processor detects events within the monitored activities and saves a summary of the events to the cloud server, the summary includes one or more of video, image, text, audio, charts and graphs relating to protection of the secured area; and
a user interface of the cloud server that detects a request from a user for a report of activities occurring within a real time timeline window and downloads the activity report to the user, the activity report including at least a content of the summary of the event associated with the secured area, the activity report further containing one or more of data, actions, warnings, help requests and recommendations generated by the security system or operator, wherein the cloud server updates an internal database of the cloud server in real time based upon posts from the activity analysis processor or operator;
wherein the report further comprises a list of alarms reported by the security system and an identifier of a human operator that responded to each alarm.

12. The apparatus as in claim 11 further comprising an interface processor of the cloud server that downloads the activity report to the user.

13. The apparatus of claim 12 wherein the activity report displayed to the user further comprises a playback control executing on a processor of the user and that controls playback of the summary, the playback control further including an interface that accepts requests for additional data from the user and the playback control downloads and displays the additional data to the user in response to the requests wherein the playback control allows the user to bookmark the additional data at any time for future reference.

14. The apparatus as in claim 11 wherein the report further comprises a trouble message generated by the system or a warning request in response to alarms flooding the security system.

15. The apparatus as in claim 11 wherein the report further comprises a request for help from the human operator.

16. The apparatus as in claim 11 wherein the user interface of the cloud server automatically populates a set of posts in real time to the assigned operator's terminal or workstation without receiving a user request, based upon the user logging into his/her workstation and the user interface populates the report with posts related to an assigned area or zone or related to a user profile created by the user to improve the user's day to day activity.

17. The method as in claim 1 wherein the playback features further comprise provisions to accept requests for additional data from the user and the playback features downloading and displaying the additional data in response to the requests wherein the playback controls include at least one of:
a first feature including checking an action taken by a selected operator for a selected alarm reported by the system by the user selecting the alarm from an alarm list wherein the first playback feature depicts a summary report showing comments provided by the operator and actions taken by the operator including activating a related device in response to the alarm;
a second feature including the user designating a time and date and the playback feature shows an identifier of an operator monitoring the system on the designated time and date;
a third feature including designating a time and the playback feature showing an operator monitoring the system at that time and for activities of that operator for a previous two hours;
a fourth feature of the user selecting a current time and the playback feature displaying events currently viewed by the current operator;
a fifth feature of the user selecting an operator and playback and the playback feature playing back activities of the selected operator beginning with a most recent activity and proceeding backwards in time for a predetermined time period;
a sixth feature including the user selecting an operator and the playback feature displaying any events of the selected operator logging off before an end of the selected operator's shift; and
a seventh feature including the user selecting an alarm flooding feature and the playback feature identifying any events of alarm flooding and activities taken to prevent alarm flooding.

* * * * *